US010144473B2

(12) United States Patent
Ishii et al.

(10) Patent No.: US 10,144,473 B2
(45) Date of Patent: Dec. 4, 2018

(54) STRADDLE-TYPE VEHICLE

(71) Applicant: Kawasaki Jukogyo Kabushiki Kaisha, Kobe-shi, Hyogo (JP)

(72) Inventors: Hiroshi Ishii, Kobe (JP); Tomo Yamamoto, Kobe (JP); Daisuke Saeki, Kakogawa (JP); Taku Nagata, Kakamigahara (JP); Seiichi Sonoda, Gifu (JP); Akira Yoshida, Hozumi (JP); Manabu Morikawa, Kobe (JP)

(73) Assignee: KAWASAKI JUKOGYO KABUSHIKI KAISHA, Kobe-shi, Hyogo (JP)

(*) Notice: Subject to any disclaimer, the term of this patent is extended or adjusted under 35 U.S.C. 154(b) by 256 days.

(21) Appl. No.: 15/036,715

(22) PCT Filed: Nov. 15, 2013

(86) PCT No.: PCT/JP2013/006731
§ 371 (c)(1),
(2) Date: May 13, 2016

(87) PCT Pub. No.: WO2015/071935
PCT Pub. Date: May 21, 2015

(65) Prior Publication Data
US 2016/0288853 A1    Oct. 6, 2016

(51) Int. Cl.
*B62J 17/04*    (2006.01)
*B62J 17/00*    (2006.01)
(Continued)

(52) U.S. Cl.
CPC ............... *B62J 17/04* (2013.01); *B62J 17/00* (2013.01); *B62J 17/02* (2013.01); *B62J 29/00* (2013.01)

(58) Field of Classification Search
CPC ... B62J 17/00; B62J 17/02; B62J 17/04; B62J 29/00
See application file for complete search history.

(56) References Cited

U.S. PATENT DOCUMENTS 3,971,452 A * 7/1976 Morelli .................... B62J 17/00
                                                            296/180.1
9,573,645 B2 * 2/2017 Ishii ......................... B62J 17/00
(Continued)

FOREIGN PATENT DOCUMENTS

DE        2535566 B1    9/1976
EP        2088066 A1    8/2009
(Continued)

OTHER PUBLICATIONS

ISA Japanese Patent Office, International Search Report Issued in Application No. PCT/JP2013/006731, dated Feb. 18, 2014, WIPO, 4 pages.
(Continued)

*Primary Examiner* — Jason S Morrow
(74) *Attorney, Agent, or Firm* — Alleman Hall Creasman & Tuttle LLP

(57) ABSTRACT

A straddle-type vehicle includes a front cowling covering a front portion of a vehicle body; and an aerodynamic device including an aerodynamic force generating section which generates a downforce by air flowing in a rearward direction along an upper surface of the front cowling, and the aerodynamic force generating section is placed to overlap with the upper surface of the front cowling, when viewed from above.

11 Claims, 7 Drawing Sheets

(51) Int. Cl.
*B62J 17/02* (2006.01)
*B62J 29/00* (2006.01)

(56) References Cited

U.S. PATENT DOCUMENTS

| | | | | |
|---|---|---|---|---|
| 9,656,710 B2* | 5/2017 | Chen | | B62J 6/005 |
| 9,834,268 B2* | 12/2017 | Tanabe | | B62J 17/04 |
| 9,889,900 B2* | 2/2018 | Tsuda | | B62J 17/04 |
| 9,902,450 B2* | 2/2018 | Ishii | | B62J 6/02 |
| 9,926,030 B2* | 3/2018 | Yamada | | B62J 17/00 |
| 2004/0145903 A1* | 7/2004 | Arakawa | | B60Q 1/2665 |
| | | | | 362/494 |
| 2004/0264204 A1* | 12/2004 | Toyofuku | | B62J 17/00 |
| | | | | 362/473 |
| 2007/0069545 A1* | 3/2007 | Katagiri | | B62J 17/02 |
| | | | | 296/78.1 |
| 2008/0080074 A1* | 4/2008 | Sakamoto | | B60R 1/072 |
| | | | | 359/842 |
| 2008/0093147 A1* | 4/2008 | Tanaka | | B62J 6/02 |
| | | | | 180/219 |
| 2009/0141377 A1* | 6/2009 | Kobayashi | | B62J 29/00 |
| | | | | 359/841 |
| 2010/0188764 A1* | 7/2010 | Wu | | B62J 29/00 |
| | | | | 359/872 |
| 2011/0317441 A1* | 12/2011 | Yasuhara | | B60Q 1/28 |
| | | | | 362/473 |
| 2012/0061989 A1* | 3/2012 | Yasuhara | | B62J 6/005 |
| | | | | 296/78.1 |
| 2012/0292948 A1* | 11/2012 | Iida | | B62J 17/02 |
| | | | | 296/192 |
| 2013/0100689 A1* | 4/2013 | Ohashi | | B62J 6/02 |
| | | | | 362/476 |
| 2014/0091596 A1* | 4/2014 | Maeda | | B62D 25/081 |
| | | | | 296/192 |
| 2015/0266532 A1* | 9/2015 | Horiuchi | | B62J 23/00 |
| | | | | 296/78.1 |
| 2015/0307148 A1* | 10/2015 | Kato | | B62J 29/00 |
| | | | | 359/842 |
| 2016/0214672 A1* | 7/2016 | Maeda | | B62J 17/00 |
| 2016/0236742 A1* | 8/2016 | Chen | | B60Q 1/2665 |
| 2016/0264201 A1* | 9/2016 | Inomata | | B62J 37/00 |
| 2016/0297492 A1* | 10/2016 | Yamada | | B62J 17/00 |
| 2017/0001674 A1* | 1/2017 | Ishii | | B62J 6/02 |
| 2017/0015382 A1* | 1/2017 | Takakuwa | | B62K 11/04 |
| 2017/0276104 A1* | 9/2017 | Mizuta | | B60Q 1/0408 |
| 2017/0327026 A1* | 11/2017 | Suzuki | | B60Q 1/0023 |
| 2018/0093731 A1* | 4/2018 | Nakayama | | B62J 17/04 |
| 2018/0118295 A1* | 5/2018 | Haraguchi | | B62J 17/02 |

FOREIGN PATENT DOCUMENTS

| | | | | |
|---|---|---|---|---|
| JP | S50152448 A | | 12/1975 | |
| JP | S5991982 U | | 6/1984 | |
| JP | S6057481 U | | 4/1985 | |
| JP | S6236975 U | | 3/1987 | |
| JP | 04201792 A | * | 7/1992 | B62J 17/00 |
| JP | H07117757 A | | 5/1995 | |
| JP | 2003276669 A | | 10/2003 | |
| JP | 2006213249 A | * | 8/2006 | B62J 17/00 |
| JP | 2010013065 A | * | 1/2010 | B62J 17/00 |
| JP | 2013018306 A | * | 1/2013 | B62J 17/02 |
| JP | 2013248990 A | * | 12/2013 | B60Q 1/12 |
| JP | 2017019408 A | * | 1/2017 | B60Q 1/0035 |

OTHER PUBLICATIONS

The State Intellectual Property Office of the People's Republic of China, Office Action Issued in Chinese Application No. 201380080932.5, dated Oct. 26, 2017, 8 pages. (Submitted with English Translation of Search Report).

ISA Japanese Patent Office, Written Opinion of the International Searching Authority Issued in Application No. PCT/JP2013/006731, dated Feb. 18, 2014, WIPO, 6 pages.

* cited by examiner

STRADDLE-TYPE VEHICLE

TECHNICAL FIELD

The present invention relates to a straddle-type vehicle including a front cowling and an aerodynamic device.

BACKGROUND ART

In a motorcycle disclosed in Japanese Laid-Open Patent Application Publication No. 2003-276669, a mirror housing is provided to improve aerodynamic characteristics.

SUMMARY OF INVENTION

Technical Problem

In some cases, the motorcycle disclosed in Japanese Laid-Open Patent Application Publication No. 2003-276669 requires further improvement of the aerodynamic characteristics.

The present invention has been developed to solve the above-described problem, and an object of the present invention is to provide a straddle-type vehicle which can improve the aerodynamic characteristics.

Solution to Problem

To achieve the above-described object, a straddle-type vehicle of the present invention comprises: a front cowling covering a front portion of a vehicle body; and an aerodynamic device including an aerodynamic force generating section which generates a downforce by air flowing in a rearward direction along an upper surface of the front cowling, wherein the aerodynamic force generating section is placed to overlap with the upper surface of the front cowling, when viewed from above.

The air flowing in the rearward direction along the upper surface of the front cowling is guided by the front cowling and smoothly flows. Therefore, the disordered flow of the air can be suppressed. In accordance with the above-described configuration, since the air is supplied to the aerodynamic force generating section in a state in which the disordered flow is suppressed by the front cowling. As a result, the aerodynamic force generating section can generate a downforce effectively.

Advantageous Effects of Invention

In accordance with the present invention, the downforce can be generated effectively by the aerodynamic force generating section, and therefore, aerodynamic characteristics can be improved.

DESCRIPTION OF EMBODIMENTS

Figure 1:
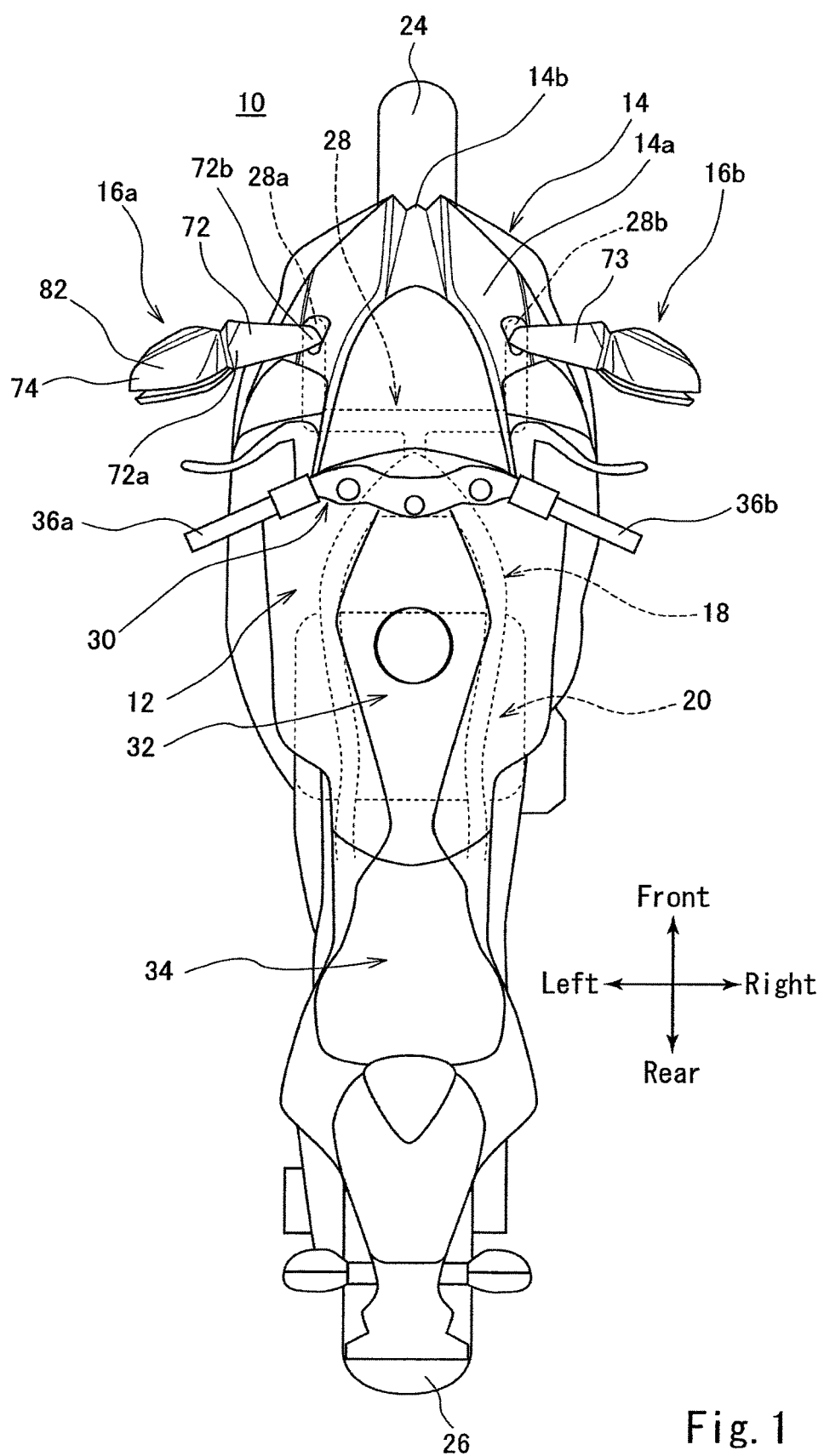
FIG. 1 is a plan view of a straddle-type vehicle according to Embodiment 1.

Hereinafter, the preferred embodiments of a straddle-type vehicle according to the present invention will be described with reference to the accompanying drawings. The directions stated below are from the perspective of a rider straddling the straddle-type vehicle, and a rightward and leftward direction corresponds to a vehicle width direction.

Embodiment 1

First, a situation in which it is necessary to apply a downforce to the vehicle body of the straddle-type vehicle of the present embodiment will be described. In a straddle-type vehicle 10, each of side cowlings 15a, 15b is inclined in an outward direction of the vehicle width direction, from its front end portion to its rear end portion, and thereby diverts air flowing toward the rider's legs. The rear end portions of the side cowlings 15a, 15b are located in the vicinity of a radiator 23. The air which has flowed through the radiator 23 flows to a rear region and to a lower region within the vehicle width of the vehicle body, while preventing interference with the side cowlings 15a, 15b. The side cowlings 15a, 15b serve to guide the air to the radiator 23. The front ends of the inner side surfaces of the side cowlings 15a, 15b in the vehicle width direction are located in front of the radiator 23. The upper portion of a space formed between the left side cowling 15a and the right side cowling 15b is closed by a head lamp unit 56, a front cowling 14, and others. An opening is provided between the pair of left and right side cowlings 15a, 15b, to introduce the air into the vehicle body. The radiator 23 is disposed between the side cowlings 15a, 15b and rearward relative to the front end portions of the side cowlings 15a, 15b. In this layout, the air is guided in a rearward direction from the front ends of the side cowlings 15a, 15b to a rear region through the space formed between the side cowlings 15a, 15b. This air is guided to the radiator 23 without being diverted to an outward region in the vehicle width direction.

If the air is guided in a large amount to the space formed between the side cowlings 15a, 15b, while the straddle-type vehicle 10 is traveling at a high speed, the air guided to the space formed between the side cowlings 15a, 15b causes a force for raising a front wheel 24 to be generated in the vehicle 10, so that the grounding load of the front wheel 24 tends to be reduced. In the present embodiment, the front surface of the radiator 23 and the front surface of the cylinder of an engine 20 are inclined in the rearward direction as they extend in a downward direction. For this reason, the force for raising the front wheel 24 tends to act on the vehicle body. In the present embodiment, by using the front cowling 14 which will be described later, the downforce is generated to push down the front cowling 14, by the air which collides with the surface of the front cowling 14 facing upward. In this way, it becomes possible to suppress reduction of the grounding load of the front wheel 24, and easily transmit driving power and a braking force from the front wheel 24 to a road surface, while the vehicle 10 is traveling at a high speed. Since the downforce is generated and the grounding load of the front wheel 24 is increased irrespective of the air guided to the space formed between the side cowlings 15a, 15b, the driving power and the braking force applied from the front wheel 24 to the road surface can be increased, and a traveling performance can be improved.

Figure 2:
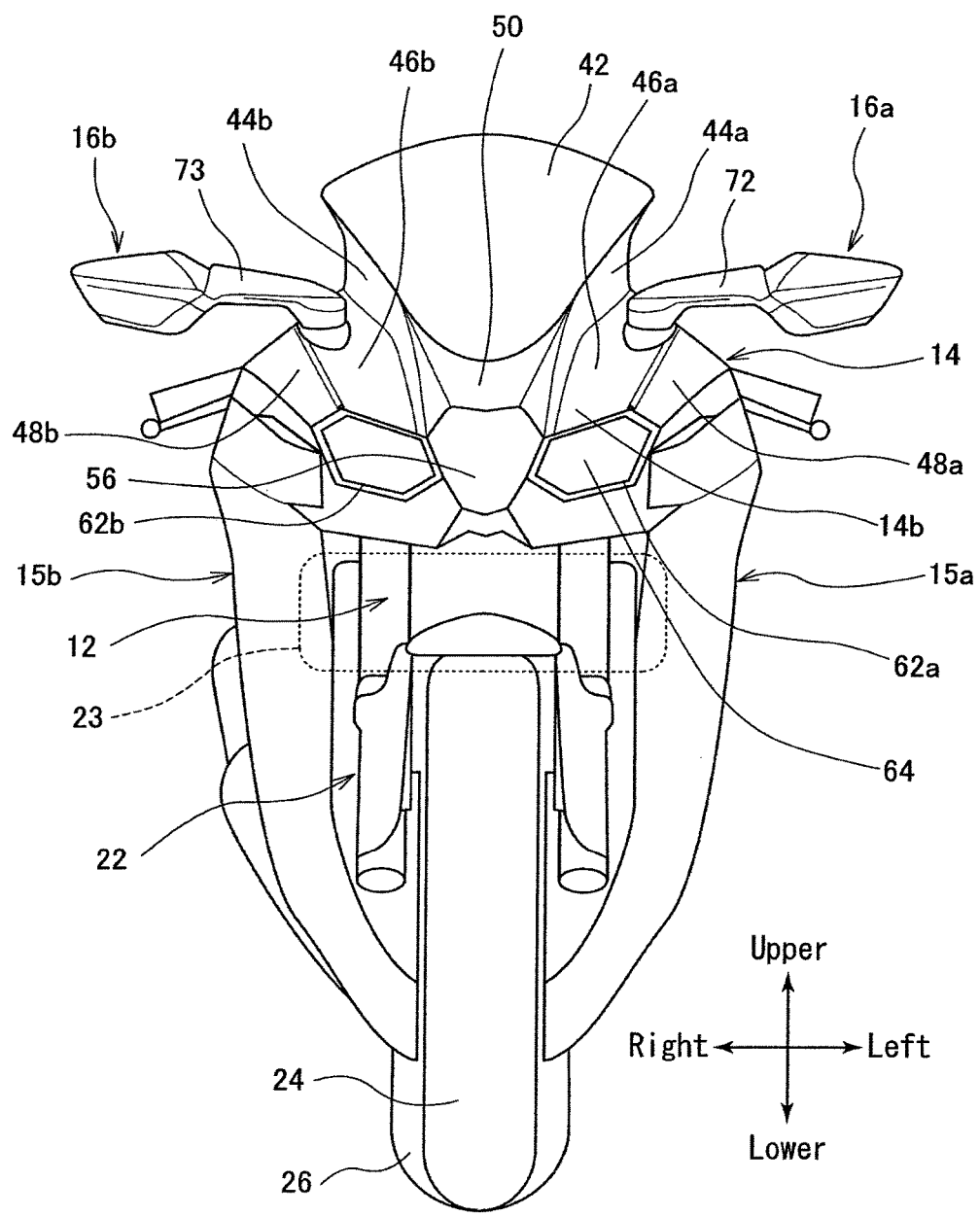
FIG. 2 is a front view of the straddle-type vehicle of FIG. 1.

Hereinafter, the configuration or the like of the straddle-type vehicle 10 will be specifically described. FIG. 1 is a plan view showing the configuration of the straddle-type vehicle 10 according to Embodiment 1. FIG. 2 is a front view showing the configuration of the straddle-type vehicle 10. The straddle-type vehicle 10 of the present embodiment is a motorcycle and receives the air from the front while the straddle-type vehicle 10 is traveling. As shown in FIG. 1, the straddle-type vehicle 10 includes the vehicle body 12, a front cowling 14 covering the front portion of the vehicle body 12 from above, the pair of left and right side cowlings 15a, 15b covering the vehicle body 12 from the side, and a pair of left and right aerodynamic devices 16a, 16b mounted to the front cowling 14. The aerodynamic devices 16a, 16b are members configured to generate a downforce which is a downward lift force. The air from the front flows along the upper and lower surfaces of the aerodynamic devices 16a, 16b, and thereby the downforce is generated. In the present embodiment, the aerodynamic devices 16a, 16b are realized by use of mirror stays supporting mirror housings 82, respectively.

Initially, the configuration of the vehicle body 12 will be described. As shown in FIG. 1, the vehicle body 12 includes a vehicle body frame 18, the engine 20 mounted to the vehicle body frame 18, the front wheel 24 supported by front forks 22 (FIG. 2) at the front portion of the vehicle body frame 18, and a rear wheel 26 mounted to a swing arm (not shown) at the rear portion of the vehicle body frame 18. A support member 28 of a substantially-Y shape in which its front portion includes two branch parts facing the front, when viewed from above, is connected to the front portion of the vehicle body frame 18. The two branch parts of the support member 28 are formed with mounting sections 28a, 28b to which the aerodynamic devices 16a, 16b are mounted, respectively.

The vehicle body 12 further includes a steering handle 30, a fuel tank 32 placed rearward relative to the steering handle 30, and a seat 34 placed behind the fuel tank 32. The steering handle 30 is provided with a pair of left and right grips 36a, 36b. The rider straddles the seat 34, grips the grips 36a, 36b, and steers the steering handle 30.

Next, the configuration of the front cowling 14 will be described. As shown in FIG. 2, the front cowling 14 includes a pair of left and right shield support sections 44a, 44b for supporting a wind shield 42, a pair of left and right first inclined portions 46a, 46b provided at locations that are outward in a rightward and leftward direction relative to the shield support sections 44a, 44b, respectively, a pair of left and right second inclined portions 48a, 48b provided at locations that are outward in the rightward and leftward direction relative to the first inclined portions 46a, 46b, respectively, and a third inclined portion 50 provided between the pair of left and right first inclined portions 46a, 46b and in front of the wind shield 42. The aerodynamic device 16a is mounted to the left first inclined portion 46a, while the aerodynamic device 16b is mounted to the right first inclined portion 46b. A front end portion 14b of the front cowling 14 is formed with a pair of left and right openings 62a, 62b which face to the front. The left half part of the front cowling 14 and the right half part of the front cowling 14 are symmetric in the rightward and leftward direction. As shown in FIG. 1, an upper surface 14a of the front cowling 14 has a shape (in the present embodiment, substantially-V shape) in which a width in the rightward and leftward direction is increased in the rearward direction from the front end portion 14b of the front cowling 14.

Figure 3:
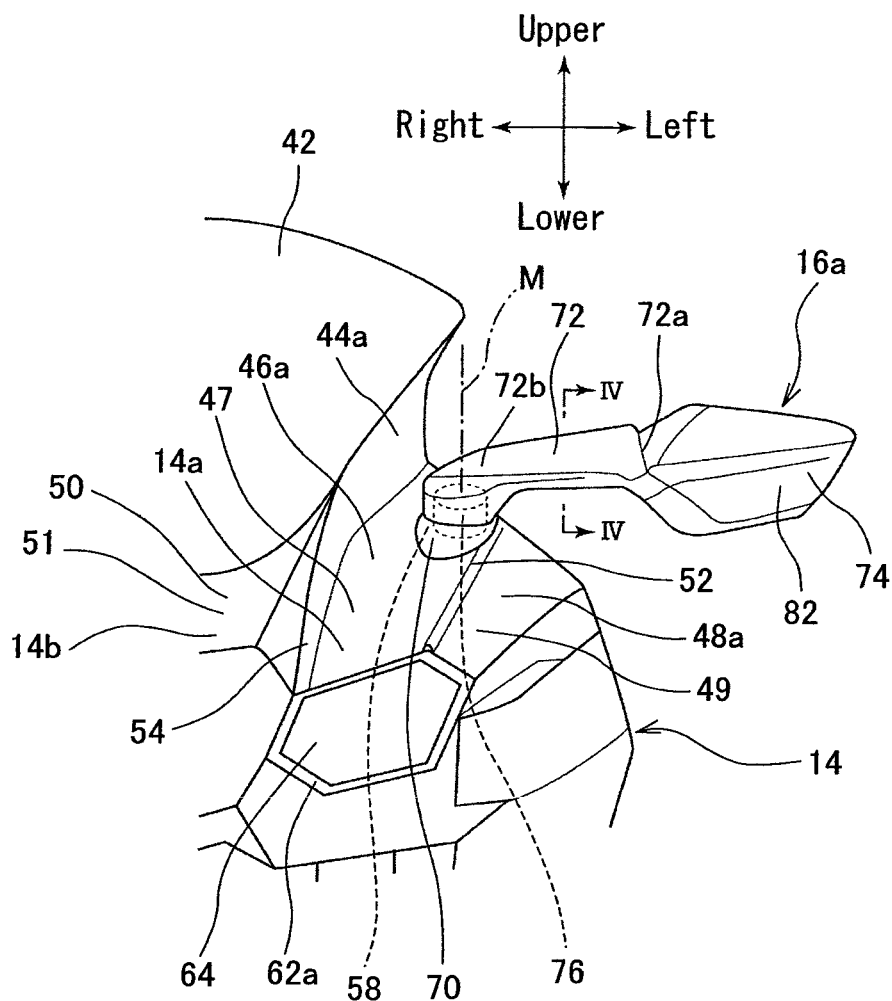
FIG. 3 is a front view showing a front cowling and an aerodynamic device of FIG. 2.

FIG. 3 is a front view showing the configuration of the left half part of the front cowling 14 and the left aerodynamic device 16a. As shown in FIG. 3, the front cowling 14 located below the aerodynamic device 16a, 16b is inclined in the upward direction, from its front end toward its rear portion. Likewise, the front cowling 14 located below the aerodynamic device 16a, 16b is inclined in an outward direction of the vehicle width direction, from the inside in the vehicle width direction toward the aerodynamic device 16a, 16b, from the front end toward the rear portion. In this structure, the air guided to the aerodynamic device 16a, 16b is gathered, and the downforce generated is increased.

Specifically, the upper surface of the first inclined portion 46a of the front cowling 14 has a smooth first inclined surface 47 which is inclined to be higher as it extends in the rearward direction. The upper surface of the second inclined portion 48a of the front cowling 14 has a smooth second inclined surface 49 which is inclined to be lower as it extends in the outward direction of the rightward and leftward direction and inclined to be higher as it extends in the rearward direction. The upper surface of the third inclined portion 50 has a smooth third inclined surface 51 which is inclined to be higher as it extends in the rearward direction. The first inclined surface 47, the second inclined surface 49, and the left half part of the third inclined surface 51 define the left half part of the upper surface 14a of the front cowling 14.

As shown in FIG. 3, at a boundary between the first inclined surface 47 and the second inclined surface 49, a first protruding portion 52 is provided to extend substantially in a forward and rearward direction. At a boundary between the first inclined surface 47 and the third inclined surface 51, a second protruding portion 54 is provided to extend substantially in the forward and rearward direction, continuously with the shield support section 44a in the forward and rearward direction. The first protruding portion 52, the second protruding portion 54, and the shield support section 44a serve as a "guide section" which guides the air flowing in the rearward direction along the first inclined surface 47 and the second inclined surface 49 (namely, the upper surface 14a of the front cowling 14) to an aerodynamic force generating section 72 of the aerodynamic device 16a.

As shown in FIG. 3, a seat section 58 on which a base section 70 of the aerodynamic device 16a is placed, is provided at a portion of the upper surface of first inclined portion 46, the portion being located rearward relative to the front end portion 14b of the front cowling 14. The seat section 58 is formed with a hole into which a mounting member such as a bolt is inserted, although the hole is not shown. The base section 70 of the aerodynamic device 16a is mounted to the mounting section 28a (FIG. 1) by the mounting member inserted into this hole.

As shown in FIG. 3, the front end portion 14b of the front cowling 14 is formed with the opening 62a, at a location that is below the first inclined portion 46a and the second inclined portion 48a. In the present embodiment, a ram duct 64 is placed below the first inclined portion 46a. The ram duct 64 is connected to the opening 62a. The air taken into the ram duct 64 through the opening 62a is supplied to the engine 20 (FIG. 1) via an air cleaner or the like which is not shown. The ram duct 64 may be connected to the right opening 62b (FIG. 2), or may be placed below the right first inclined portion 46b (FIG. 2).

Next, the configuration of the aerodynamic devices 16a, 16b will be described. The pair of left and right aerodynamic devices 16*a*, 16*b* of FIG. 2 are side mirrors by which a rider sees a rearward region. The left aerodynamic device 16*a* and the right aerodynamic device 16*b* are symmetric in the rightward and leftward direction. Hereinafter, with reference to FIG. 3, the configuration of the left aerodynamic device 16*a* will be described.

As shown in FIG. 3, the aerodynamic device 16*a* includes the base section 70, the aerodynamic force generating section 72, and a mirror section 74. The aerodynamic force generating section 72 is a mirror stay which is elongated and extends to include a base end portion 72*b* and a tip end portion 72*a*. The base section 70 is integrated with the base end portion 72*b*. The mirror section 74 is integrated with the tip end portion 72*a*. The aerodynamic force generating section 72 has an elongated plate shape in which a dimension in the vehicle width direction is greater than a dimension in the forward and rearward direction. The front cowling 14 located below the aerodynamic force generating section 72 extends to a location that is in front of the aerodynamic force generating section 72 (see FIG. 1). This allows the air faired and flowing along the front cowling 14 to be guided to the aerodynamic force generating section 72.

As shown in FIG. 3, the base section 70 is a portion at which the base end portion 72*b* of the aerodynamic force generating section 72 is mounted to the front cowling 14 in such a manner that the aerodynamic force generating section 72 is rotatable. The base section 70 accommodates therein a rotation mechanism 76 which rotates the aerodynamic device 16*a* around a rotary shaft M extending vertically. The base section 70 is placed on the seat section 58 provided on the upper surface of the first inclined portion 46*a*. The base section 70 is mounted to the mounting section 28*a* (FIG. 1) by use of the mounting member (not shown) such as the bolt. The mirror section 74 includes a mirror 80 (see FIG. 4) and the mirror housing 82 which accommodates the mirror 80 therein in such a manner that the mirror 80 is angularly displaceable.

Figure 5:
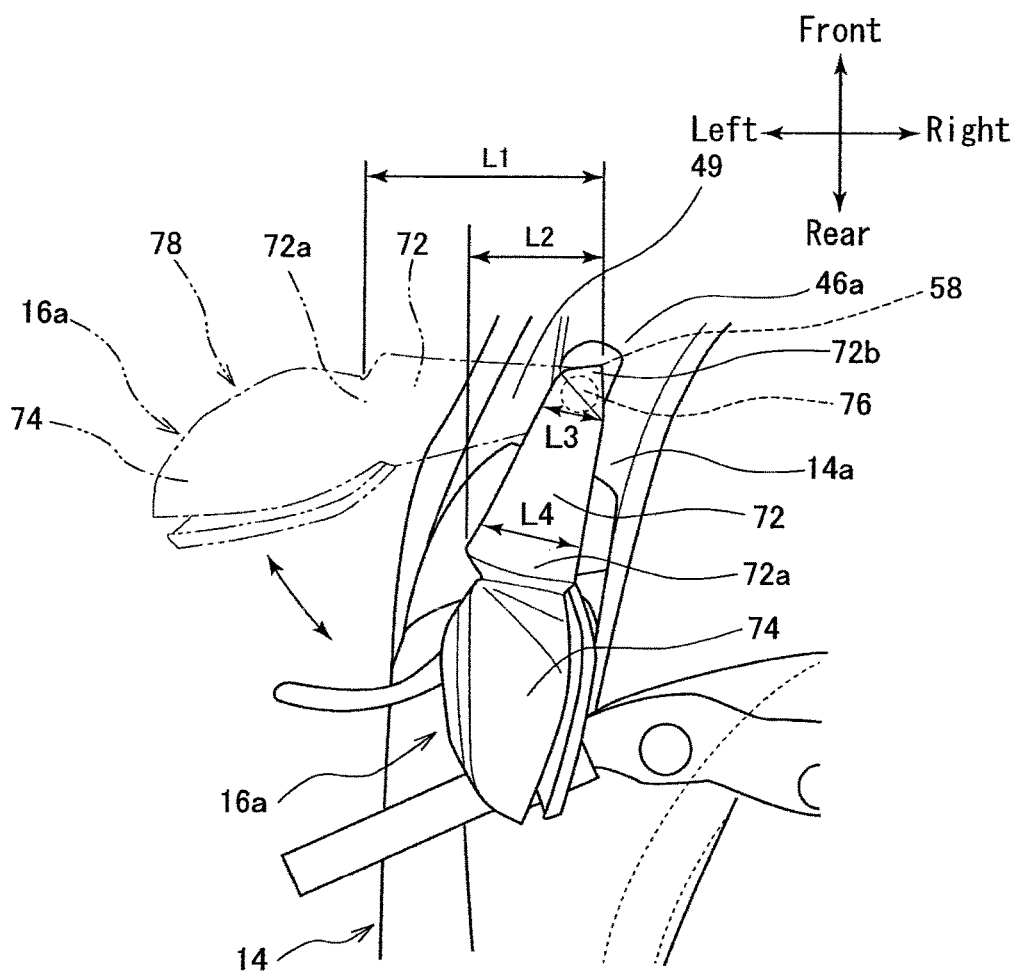
FIG. 5 is a plan view showing a state in which the aerodynamic device of FIG. 3 is retracted.

FIG. 5 is a plan view showing a state in which the aerodynamic device 16*a* is retracted. As shown in FIG. 5, the aerodynamic device 16*a* can be selectively placed in a first state (two-dotted line) in which the aerodynamic device 16*a* is rotated by the rotation mechanism 76 and the dimension of the aerodynamic force generating section 72 in the rightward and leftward direction is L1, or a second state (solid line) in which the dimension of the aerodynamic force generating section 72 in the rightward and leftward direction is L2 which is smaller L1 (L1>L2). For example, while the straddle-type vehicle 10 is traveling, the aerodynamic device 16*a* is placed in the first state, while when the straddle-type vehicle 10 is put into a garage or the like, the aerodynamic device 16*a* is placed in the second state.

As shown in FIG. 5, the dimension L2 in the rightward and leftward direction, of the aerodynamic force generating section 72 in the second state, is smaller than the dimension L1 in the rightward and leftward direction, of the aerodynamic force generating section 72 in the first state. Therefore, when a portion of the aerodynamic device 16*a* which protrudes in the outward direction of the rightward and leftward direction from the front cowling 14 is expressed as a "protruding portion 78," the dimension in the rightward and leftward direction, of the protruding portion 78 in the second state, is smaller than the dimension in the rightward and leftward direction, of the protruding portion 78 in the first state. In the present embodiment, in the second state, the protruding portion 78 does not exist, and therefore the dimension in the rightward and leftward direction, of the protruding portion 78 in the second state, is zero. A dimension L4 in the forward and rearward direction, of the tip end portion of the aerodynamic force generating section 72, is greater than a dimension L3 in the forward and rearward direction, of the base end portion of the aerodynamic force generating section 72. This makes it possible to increase the dimension of the aerodynamic force generating section 72 in the forward and rearward direction, while allowing the aerodynamic device 16*a*, 16*b* to be configure to be rotatable.

As shown in FIG. 3, the seat section 58 on which the base section 70 is placed is located rearward relative to the front end portion 14*b* of the front cowling 14. Therefore, when the aerodynamic device 16*a* is placed in the first state, the aerodynamic force generating section 72 and the mirror section 74 are located rearward relative to the front end portion 14*b* of the front cowling 14. In other words, at least a portion of the upper surface 14*a* of the front cowling 14 is located in front of the aerodynamic force generating section 72 and the mirror section 74. As shown in FIG. 5, when the state of the aerodynamic device 16*a* is shifted from the first state to the second state, the aerodynamic device 16*a* is rotated in the rearward direction around the rotary shaft M (FIG. 3). Therefore, when the aerodynamic device 16*a* is placed in the second state, the aerodynamic force generating section 72 and the mirror section 74 are located rearward relative to the front end portion 14*b* (FIG. 3) of the front cowling 14. As shown in FIG. 5, since the seat section 58 is placed on the upper surface of the first inclined portion 46*a*, the aerodynamic force generating section 72 is placed to overlap with at least the second inclined surface 49 of the upper surface 14*a* of the front cowling 14 when viewed from above, under the state in which the aerodynamic device 16*a* is placed in the first state. To be precise, the aerodynamic force generating section 72 is placed to overlap with the upper surface 14*a* of the rear portion of the front cowling 14 when viewed from above.

Hereinafter, the configuration of the aerodynamic force generating section 72 in the state in which the aerodynamic device 16*a* is placed in the first state, will be described. In FIGS. 1 and 2, a reference symbol 73 is assigned to the "aerodynamic force generating section" of the left aerodynamic device 16*b*. As shown in FIG. 3, the aerodynamic force generating section 72 serves to generate the downforce by the air flowing in the rearward direction along the upper surface 14*a* of the front cowling 14. The aerodynamic force generating section 72 extends in the outward direction of the rightward and leftward direction, from the side portion of the front cowling 14 in the rightward and leftward direction. In the present embodiment, the tip end portion 72*a* of the aerodynamic force generating section 72 is located outward the rightward and leftward direction relative to the front cowling 14.

As showing in FIG. 1, the aerodynamic force generating section 72 is configured in such a manner that a dimension in the rightward and leftward direction is greater than a dimension in the forward and rearward direction. Also, the aerodynamic force generating section 72 is configured in such a manner that the dimension of the base end portion 72*b* in the forward and rearward direction is smaller than the dimension of the tip end portion 72*a* in the forward and rearward direction. In the present embodiment, the aerodynamic force generating section 72 has a shape (e.g., a trapezoidal shape or a triangular shape when viewed from above) in which the dimension in the forward and rearward direction is gradually increased from the base end portion 72*b* toward the tip end portion 72*a*. Therefore, the downforce can be generated effectively in the tip end portion 72*a* or a region which is in the vicinity of the tip end portion 72*a*, while preventing interference between the base end portion 72b and the front cowling 14.

Figure 4:
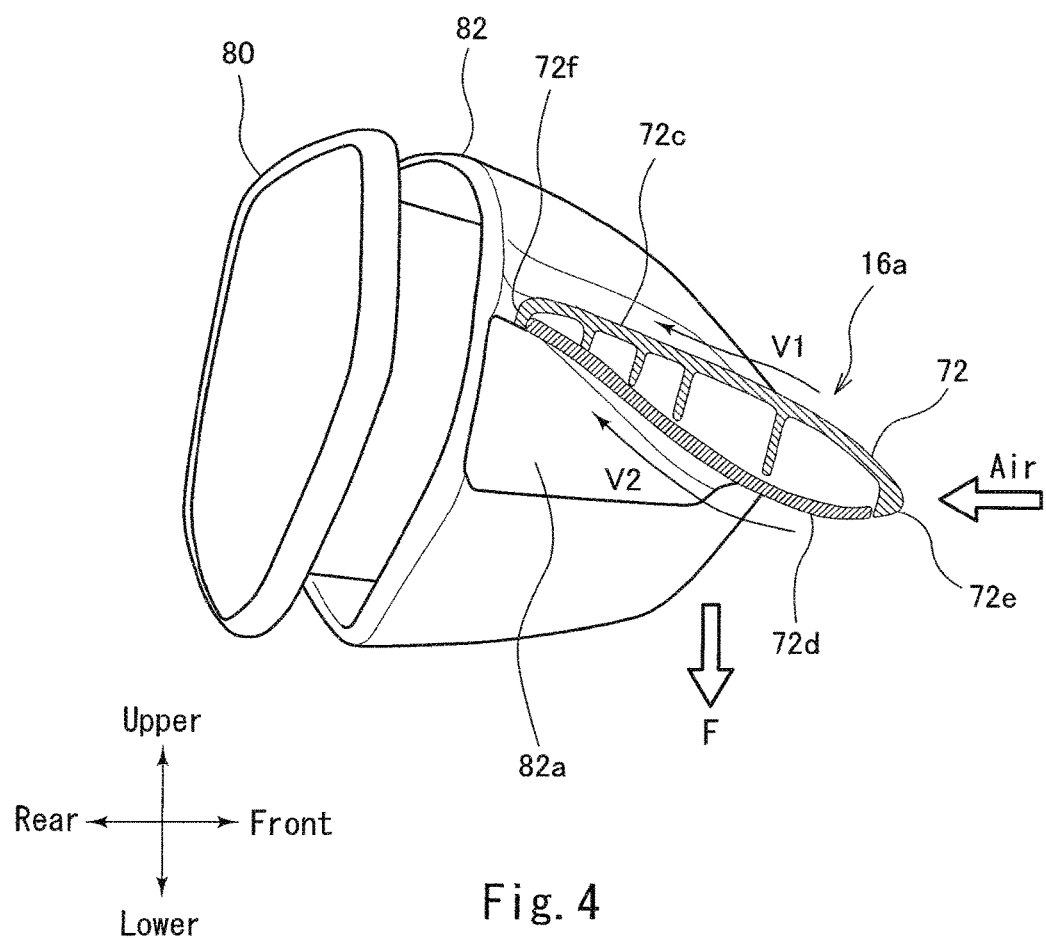
FIG. 4 is a cross-sectional view taken along line IV-IV of FIG. 3.

FIG. 4 is a cross-sectional view of the aerodynamic force generating section 72 of FIG. 3. As shown in FIG. 4, the aerodynamic force generating section 72 has a plate shape in which a dimension in the forward and rearward direction is greater than a dimension in a vertical direction (vertical dimension). The aerodynamic force generating section 72 has an inverted wing shape in which the vertical dimension of the front portion is reduced as it extends in the forward direction, and the vertical dimension of the rear portion is reduced as it extends in the rearward direction. The aerodynamic force generating section 72 is inclined in the upward direction, from a front end 72e toward a rear end 72f. An upper surface 72c of the aerodynamic force generating section 72 is formed by a curved surface which is inclined to be higher as it extends in the rearward direction and protrudes gradually in the upward direction. A lower surface 72d of the aerodynamic force generating section 72 is formed by a curved surface protruding in the downward direction with a curvature which is greater than that of the upper surface 72c. At the front end 72e of the aerodynamic force generating section 72, the upper surface 72c and the lower surface 72d are connected to each other via a gradually curved surface. A portion of the aerodynamic force generating section 72, with a greatest thickness, is located in front of the center of the aerodynamic force generating section 72 in the forward and rearward direction.

In the above-described configuration, when the air is supplied to the aerodynamic force generating section 72, the separation of the air from the upper surface 72c and the lower surface 72d is suppressed, and the flow velocity V2 of the air flowing along the lower surface 72d becomes higher than the flow velocity V1 of the air flowing along the upper surface 72c. Thereby, an air pressure in a region below the aerodynamic force generating section 72 becomes lower than an air pressure in a region above the aerodynamic force generating section 72, so that the downforce (force acting in the downward direction) is generated in the aerodynamic force generating section 72. In addition, since the air contacts the upper surface 72c inclined to be higher as it extends in the rearward direction, the downforce is also generated. A total force F of these downforces acts on the aerodynamic force generating section 72.

While the straddle-type vehicle 10 of FIG. 1 is traveling, the air contacts the front cowling 14. This air flows in the rearward direction along the upper surface 14a of the front cowling 14 and is supplied to the aerodynamic force generating sections 72, 73 of the aerodynamic devices 16a, 16b. As shown in FIG. 3, the upper surface 14a of the front cowling 14 is formed by smooth surfaces including the first inclined surface 47, the second inclined surface 49, the third inclined surface 51, or the like. Therefore, the air flows smoothly along the upper surface 14a, and thus, the disordered flow of the air can be suppressed. As shown in FIG. 1, the aerodynamic force generating sections 72, 73 of the aerodynamic devices 16a, 16b are placed to overlap with the upper surface 14a of the front cowling 14 when viewed from above. Therefore, the air flowing in the rearward direction along the upper surface 14a of the front cowling 14 is easily supplied to the aerodynamic force generating sections 72, 73. In accordance with the present embodiment, the air can be efficiently supplied to the aerodynamic force generating sections 72, 73 in a state in which the disordered flow of the air is suppressed. As a result, the downforce F (FIG. 4) can be generated effectively, and the straddle-type vehicle 10 can travel more stably at a high speed.

The mirror stay 72 (aerodynamic force generating section), rather than the mirror housing 82, has the wing shape. Therefore, the wing shape can be designed irrespective of design conditions required for the mirror, and the flexibility of the design can be improved. This makes it easier to design the shape for effectively obtaining aerodynamic characteristics. Since the mirror housing 82, rather than the mirror stay 72, has a great vertical dimension, the mirror housing 82 can function as an end plate, which makes it possible to prevent the air flowing in the forward and rearward direction along the upper and lower surfaces of the mirror stay 72 from being diverted to the outward region in the vehicle width direction. In this case, the mirror stay 72 and the mirror housing 82 are preferably connected to each other at a location which is higher than the intermediate portion of the mirror housing 82 in the vertical direction. In this configuration, a portion of the outer surface of the mirror housing 82, the portion (inward surface in the vehicle width direction) being located inward in the vehicle width direction, can suitably function as the tip end plate. In particular, a portion 82a of the inward surface of the mirror housing 82 in the vehicle width direction, the portion 82a being located below the tip end portion 72a (FIG. 3) of the mirror stay 72, is formed by a surface (restricting section 82a) which is substantially perpendicular to the lengthwise direction of the mirror stay 72, to suitably guide the air flowing along the lower surface 72d of the mirror stay 72. The restricting section 82a preferably has a flat surface which is substantially perpendicular to the lengthwise direction of the mirror stay 72. The mirror stay 72 is preferably connected to the mirror housing 82 in a range from the front end portion of the inward surface in the vehicle width direction to the rear end portion of the inward surface in the vehicle width direction. This makes it possible to increase the length of the aerodynamic devices 16a, 16b in the forward and rearward direction and increase the downforce to be generated.

The mirror is attached to the mirror housing. For this reason, in the rear end portion (downstream side in a flow direction of the air) of the mirror housing, the upper and lower surfaces of the mirror housing are spaced apart from each other in the vertical direction, and thereby the air is disordered. In this situation, the downforce cannot be sufficiently generated by using only the mirror housing. In contrast, in the present embodiment, in a cross-section which is perpendicular to the vehicle width direction, the upper and lower surfaces of the stay 72 are close to each other, at the rear edge of the stay 72. In other words, the height of the stay 72 in the vertical direction is gradually reduced, from the center portion of the stay 72 in the forward and rearward direction toward the rear edge of the stay 72. This configuration can prevent the disordered flow (separation) of the air which has flowed through the stay 72.

Since the aerodynamic devices 16a, 16b are detachably mounted to the front cowling 14, aerodynamic devices having shapes adapted to traveling purposes can be mounted. As shown in FIG. 3, since the first protruding portion 52, the second protruding portion 54, and the shield support section 44a are provided as the "guide section", the air can be easily supplied to the aerodynamic force generating sections 72, 73.

As shown in FIG. 1, the upper surface 14a of the front cowling 14 has a shape in which a width in the rightward and leftward direction is increased from the front end portion 14b toward the rear portion. Since the aerodynamic force generating sections 72, 73 are placed rearward relative to the front end portion 14b, the air which has been guided by the front portion of the front cowling 14 and faired is easily supplied to the aerodynamic force generating sections 72, 73. Since the aerodynamic force generating sections 72, 73 extend outward in the rightward and leftward direction from the left and right side portions of the front cowling 14, respectively, the air which has collided with the front portion of the front cowling 14 and has been divided to the left and the right, is easily supplied to the aerodynamic force generating sections 72, 73.

As shown in FIG. 1, since the aerodynamic force generating sections 72, 73 extend in the direction (the rightward and leftward direction) which is perpendicular to the traveling direction and the vertical direction, the portions of the aerodynamic force generating sections 72, 73 which the air contacts have a great area. As shown in FIG. 4, the aerodynamic force generating section 72 has an inverted wing shape. The upper surface 72c of the aerodynamic force generating section 72 is inclined to be higher as it extends in the rearward direction. With the above-describe configurations, the downforce can be generated effectively.

As shown in FIG. 5, when the straddle-type vehicle 10 is put into a garage or the like, the aerodynamic devices 16a, 16b is retractable. Therefore, the straddle-type vehicle 10 can be easily accommodated into the garage or the like.

As shown in FIG. 3, since the mirror housing 82 is provided at the tip end of the aerodynamic force generating section 72, the mirror stay is also used as the aerodynamic force generating section 72. In other words, since the aerodynamic devices 16a, 16b are provided by utilizing the side mirrors, respectively, it is not necessary to provide a new aerodynamic device, and therefore the number of components can be reduced. Since the downforce F (FIG. 4) can be generated by the aerodynamic force generating section 72 placed between the base end portion 72b of the aerodynamic force generating section 72 and the mirror housing 82, torque acting on the base end portion 72b can be reduced, and damage to the base end portion 72b can be reduced, compared to a case where the downforce is generated by, for example, the mirror housing. Further, since the downforce is generated at a location that is as distant from the center of gravity of the vehicle 10 as possible, it becomes possible to increase a force for pushing down the front wheel 24, by the generated downforce.

Figure 6:
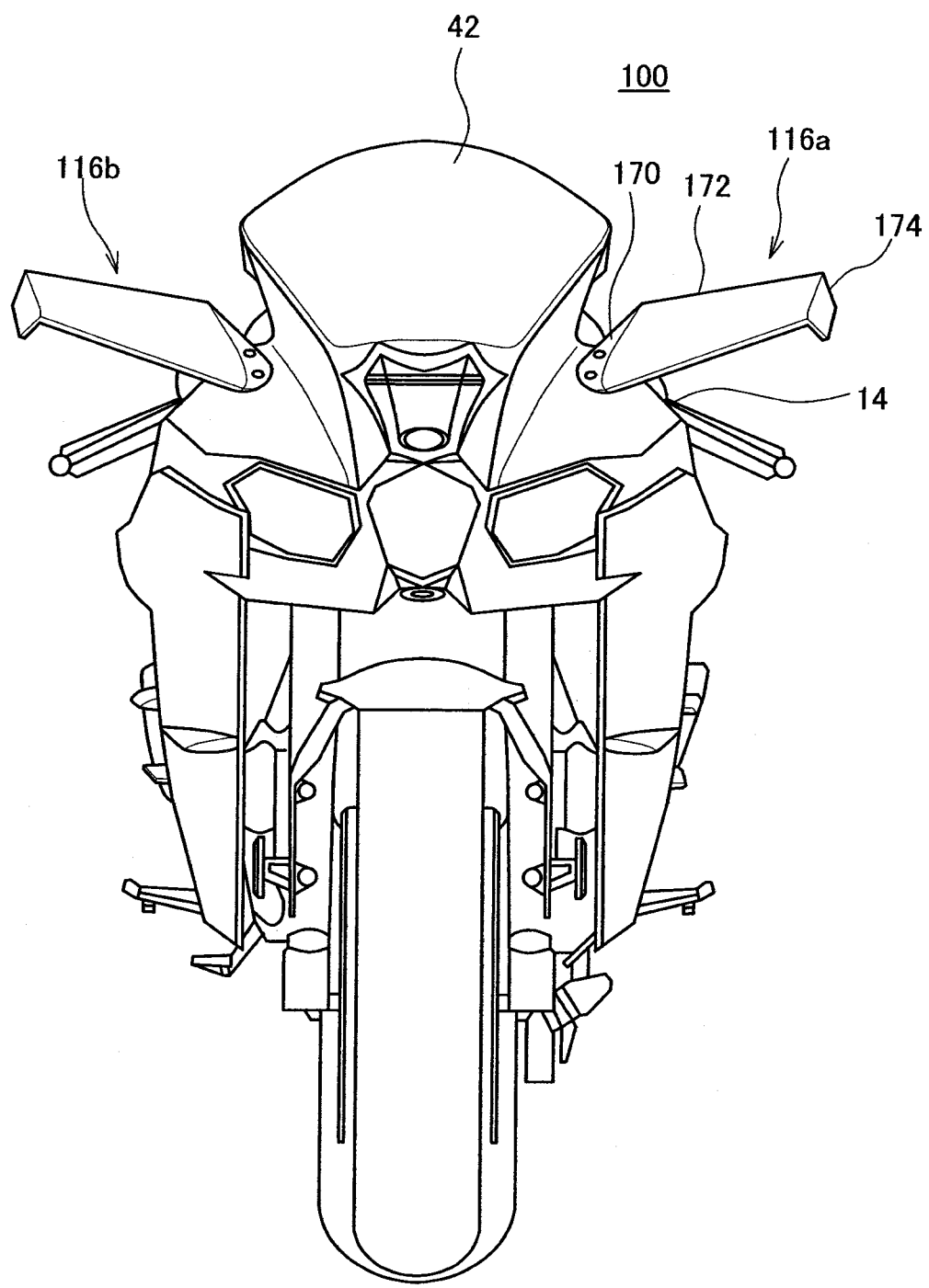
FIG. 6 is a front view showing the configuration of a straddle-type vehicle according to Embodiment 2.

As shown in FIG. 6, each of the mirrors 80 is attached to the mirror housing 82 in such a manner that the mirror 80 is displaceable with respect to the mirror housing 82. Therefore, in a case where the posture of the mirror 80 is changed according to the rider's body constitution or taste, it is not necessary to change the posture of the mirror housing 82 or the aerodynamic force generating section 72, with respect to the front cowling 14, and the downforce can be stably generated in the aerodynamic force generating section 72. Further, the downforces acting on the pair of left and right aerodynamic force generating sections 72, 73 can be efficiently transmitted to the vehicle body frame 18 via the support member 28 of FIG. 1.

In the above-described embodiment, the "guide section" for guiding the air to the aerodynamic force generating sections 72, 73 is provided at the front cowling 14. This "guide section" may be provided at the aerodynamic devices 16a, 16b, or both of the front cowling 14 and the aerodynamic devices 16a, 16b.

As shown in FIG. 5, in the above-described embodiment, the rotation mechanism 76 is used to change the dimension of the protruding portion 78 in the rightward and leftward direction. Alternatively, an extension/retraction mechanism (not shown) for extending or retracting the aerodynamic force generating section may be used. Further, the aerodynamic force generating sections 72, 73 may be configured to change the postures (inclination angles). For example, each of the aerodynamic force generating sections 72, 73 may be rotatable around a rotary shaft extending in the rightward and leftward direction. In accordance with this configuration, the magnitude of the downforce generated in each of the aerodynamic force generating sections 72, 73 can be appropriately changed.

Embodiment 2

Figure 7:
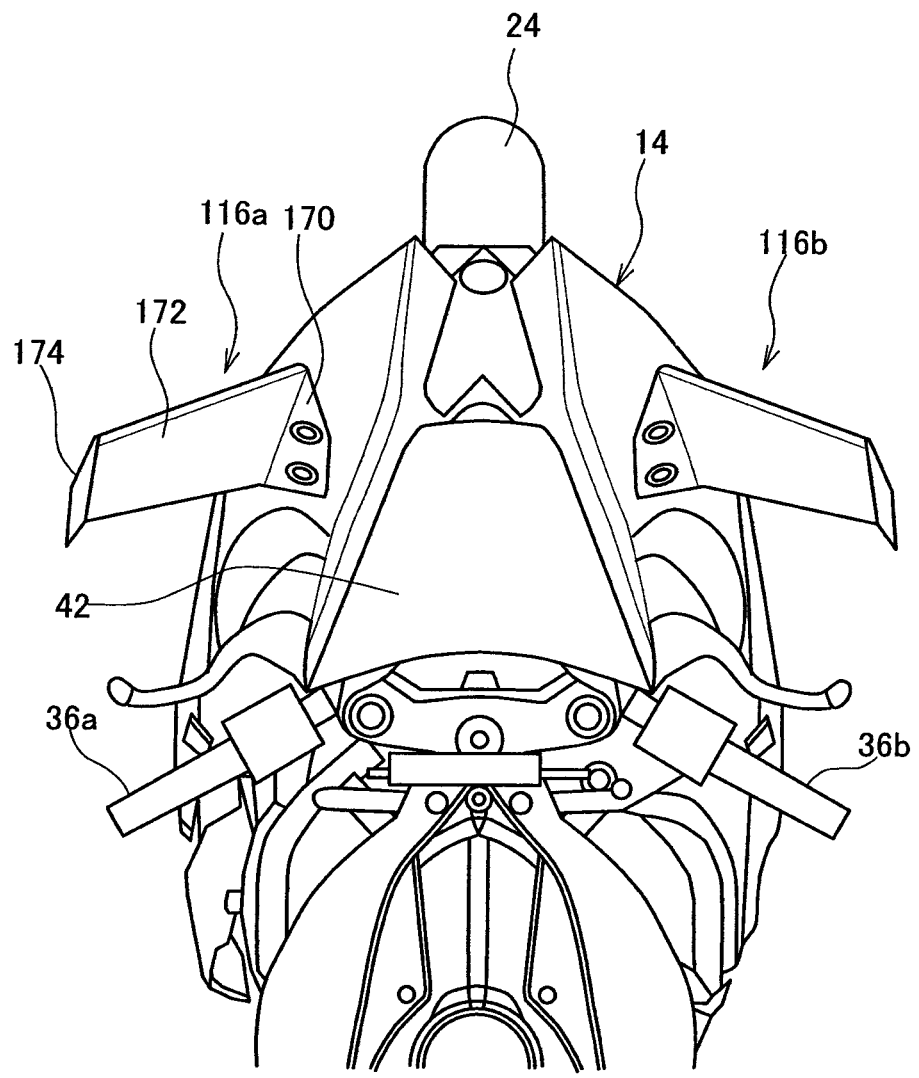
FIG. 7 is a plan view showing major components of the straddle-type vehicle of FIG. 6.

FIG. 6 is a front view showing the configuration of a straddle-type vehicle 100 according to Embodiment 2. FIG. 7 is a plan view showing the major components of the straddle-type vehicle 100 of FIG. 6. In FIGS. 6 and 7, the same components as those of Embodiment 1 are designated by the same reference symbols, and will not be described repeatedly. As shown in FIGS. 6 and 7, the vehicle 100 of the present embodiment does not include a side mirror. A pair of left and right aerodynamic devices 116a, 116b are mounted to the front cowling 14 at the same locations as those of Embodiment 1. The aerodynamic devices 116a, 116b are members for generating the downforce which is a downward lift force. The air from the front flows along the upper and lower surfaces of each of the aerodynamic devices 116a, 116b, and thus the downforce is generated.

The pair of left and right aerodynamic devices 116a, 116b are symmetric in the rightward and leftward direction with respect to the center of the vehicle 10 in the vehicle width direction. Therefore, the left aerodynamic device 116a will be described. The aerodynamic device 116a includes a base section 170 fastened to the front cowling 14 by a fastener member (e.g., a bolt or a screw), a plate-shaped aerodynamic force generating section 172 extending outward in the vehicle width direction, continuously from the base section 170, and a plate-shaped restricting section 174 protruding from the tip end of the aerodynamic force generating section 172 in such a manner that the restricting section 174 is bent in the downward direction. The aerodynamic force generating section 172 has a cross-sectional shape which is similar to that of the aerodynamic force generating section 72 of Embodiment 1. The aerodynamic force generating section 172 is inclined in the upward direction from the base section 170 toward a tip end that is located outward in the vehicle width direction. The tip end of the aerodynamic force generating section 172 protrudes farther outward in the vehicle width direction than the front cowling 14 does. When viewed from above, the front edge and rear edge of the aerodynamic force generating section 172 are inclined in the rearward direction as they extend in the outward direction of the vehicle width direction. The dimension of the aerodynamic force generating section 172 in the forward and rearward direction is decreased as the aerodynamic force generating section 172 extends in the outward direction of the vehicle width direction. The restricting section 174 is placed to extend in a direction substantially orthogonal to the direction in which the aerodynamic force generating section 172 extends. The restricting section 174 makes it possible to suppress the air flowing along the lower surface of the aerodynamic force generating section 173 from being diverted from the aerodynamic force generating section 172 to an outward region in the vehicle width direction. The other constituents of Embodiment 2 are the same as those of Embodiment 1, and will not be described repeatedly.

The straddle-type vehicle of the present invention is applicable to a straddle-type three-wheeled vehicle, a straddle-type four-wheeled vehicle, etc., as well as the motorcycle described in the above embodiments. Although in the above-described embodiments, the front cowling 14 is inclined in the upward direction and in the outward direction of the vehicle width direction, in order to increase the downforce, the front cowling 14 may be inclined in either the upward direction or the outward direction of the vehicle width direction. The aerodynamic device may have other shapes so long as the aerodynamic device is capable of generating the downforce. For example, the aerodynamic device need not have the wing shape so long as the aerodynamic device has a shape in which its upper surface has a surface inclined as it extends in the rearward direction. Further, the aerodynamic device need not have the wing shape so long as the aerodynamic device has an outer shape which can make the flow velocity of the air flowing along the lower surface higher than the flow velocity of the air flowing along the upper surface. Moreover, one aerodynamic device may be placed to extend over the whole length of the front cowling 14 in the rightward and leftward direction.

REFERENCE CHARACTER LIST 10, 100 straddle-type vehicle (motorcycle)
12 vehicle body
14 front cowling
16a, 16b, 116a, 116b aerodynamic device
44a shield support section (guide section)
52 first protruding portion (guide section)
54 second protruding portion (guide section)
72, 73, 172 aerodynamic force generating section
80 mirror
82 mirror housing
82a, 174 restricting section

The invention claimed is:

1. A straddle-type vehicle comprising:
a front cowling covering a front portion of a vehicle body; and
at least one aerodynamic device including a base section which is fastened to the front cowling, an aerodynamic force generating section which generates a downforce by air flowing in a rearward direction along an upper surface of the front cowling, and a rotation mechanism which rotates the aerodynamic force generating section relative to the base section,
wherein the aerodynamic force generating section is placed to overlap with the upper surface of the front cowling, when viewed from above,
wherein the front cowling guides the air to a lower surface of the aerodynamic force generating section,
wherein the rotation mechanism is configured in a manner such that the aerodynamic device may be selectively placed in a first state in which a dimension of the aerodynamic force generating section in a rightward and leftward direction is greater, or in a second state in which the dimension of the aerodynamic force generating section in the rightward and leftward direction is smaller,
wherein a dimension in a forward and rearward direction, of a base end portion of the aerodynamic force generating section in the first state is smaller than a dimension in the forward and rearward direction, of a tip end portion of the aerodynamic force generating section in the first state, and
wherein the second state is a state in which the aerodynamic device is retracted so as not to protrude in an outward direction of the rightward and leftward direction from the front cowling.

2. The straddle-type vehicle according to claim 1, wherein the upper surface of the front cowling has a shape in which a width in the rightward and leftward direction is increased from a front end portion of the front cowling toward a rear portion of the front cowling, and
wherein the aerodynamic force generating section is located rearward relative to the front end portion of the front cowling and extends from a side portion of the front cowling in the rightward and leftward direction to an outward region in the rightward and leftward direction.

3. The straddle-type vehicle according to claim 1, comprising:
a wind shield mounted to the front cowling,
wherein the at least one aerodynamic device includes a pair of right and left aerodynamic devices mounted to the front cowling,
wherein the aerodynamic force generating section extends in the outward direction of the rightward and leftward direction, from a side portion of the front cowling in the rightward and leftward direction, and
wherein the base end portion of the aerodynamic force generating section is located outward in the rightward and leftward direction relative to the wind shield.

4. The straddle-type vehicle according to claim 1, wherein the aerodynamic force generating section has an inverted-wing shape in which a dimension of the front portion in a vertical direction is decreased as the front portion extends in a forward direction, and a dimension of a rear portion in the vertical direction is decreased as the rear portion extends in the rearward direction, and
wherein the front cowling is provided with a guide section at a location that is in front of the aerodynamic force generating section, to guide the air to the aerodynamic force generating section.

5. The straddle-type vehicle according to claim 1, wherein the aerodynamic device further includes the base section extending continuously from the aerodynamic force generating section and fastened to the front cowling.

6. The straddle-type vehicle according to claim 1, wherein the front cowling or the aerodynamic device is provided with a guide section located in front of the aerodynamic device to guide the air to the aerodynamic force generating section.

7. The straddle-type vehicle according to claim 1, wherein the aerodynamic device has a protruding portion protruding in the outward direction of the rightward and leftward direction from the front cowling, and is configured to be retractable in such a manner that a dimension of the protruding portion in the rightward and leftward direction is variable.

8. The straddle-type vehicle according to claim 1, wherein the tip end portion of the aerodynamic force generating section is provided with a mirror housing holding a mirror.

9. The straddle-type vehicle according to claim 8, wherein the mirror is displaceably mounted to the mirror housing.

10. The straddle-type vehicle according to claim 1, comprising:
a wind shield mounted to the front cowling,
wherein the aerodynamic force generating section is located below an upper end of the wind shield.

11. The straddle-type vehicle according to claim 1, wherein the aerodynamic force generating section is located adjacent to the front cowling in a vertical direction.

* * * * *